United States Patent Office 3,419,460
Patented Dec. 31, 1968

3,419,460
POLYETHYLENE TEREPHTHALATE FILMS
CONTAINING SURFACE PROTRUSIONS
George R. Ure, Mecklenburg, N.C., assignor to Fiber
Industries, Inc., a corporation of Delaware
No Drawing. Filed June 29, 1965, Ser. No. 468,126
22 Claims. (Cl. 161—162)

ABSTRACT OF THE DISCLOSURE

A process for the production of thermoplastic films and the product produced thereby, the process involving the dispersion of minor amounts of inert particles throughout said film whereby a film having protusions ranging from about 2 to about 100 millimicrons from the non-protruded base is obtained.

---

This invention relates to improvements in polymeric films, method of forming such films, polymers and the method for producing polymers used in the film production.

In the production of polymeric films especially for use as tapes, a great difficulty is encountered in production and use. In most instances, opposite acting electrostatic charges are believed to cause the problem of sticking. To overcome this problem, inert materials having a diameter of 0.3 micron and generally in the range of 1 to 5 microns have been added to the polymer prior to the extrusion of the film in order to provide protrusions on the surface of the film which tend to release the electrostatic charges and improve the coefficient of friction of the film into the desirable range of 0.4 to 1.0. Without the protrusions in the film surface, the coefficient of friction can range as high as 4.0 which is highly undesirable. Thus, in overcoming the problem of electrostatic charges by adding protrusions to the film surface, an additional problem has developed in the production of tapes such as magnetic tapes which require substantially surface perfection. It is a known problem that extreme protrusions on the surface such as can be produced utilizing particles having a diameter from 1 to 5 microns and as low as 0.3 micron are detrimental especially in the use of magnetic tape for computer data storage tape and the like.

By this invention, a thermoplastic film of a high molecular weight, biaxially oriented polymer is provided wherein the surface protrusions which are an integral part of the film and not as a surface additive, do not exceed 100 millimicrons and are greater than 2 millimicrons from the non-protruded surface in width or height. These surface protrusions are made up of insoluble and chemically inert particles which are free of optically polarizing properties and are incorporated in the film by substantially complete dispersion of the particles throughout the film. Surprisingly, the film as described above provides a coefficient of friction in the range from about 0.3 to about 1.0 which provides highly desirable slip characteristics in view of very small surface protrusions. This film provides a near surface perfection which has been found to be highly suitable when coated with a coating containing magnetic ferric oxide to be used as magnetic tape.

A further aspect of this invention is related to the synthetic linear orientable polymer used to produce the films described above. The types of polymers which can be used for film production include among other polyesters such as polyethylene terephthalate, polyamides such as nylon 66, nylon 6 and the like, polyolefins such as polypropylene and the like, vinyl polymers and the like. The polymers are produced by having substantially completely dispersed insoluble and chemically inert particles, which are free of optically polarizing properties, incorporated in the polymer precursor. The sizes of the particles range from about 5 to about 200 millimicrons, preferably from 5 to 50 millimicrons, more preferably from 5 to 20 millimicrons in diameter, and the preferred amount of particles ranges from about 0.01 to about 0.5 percent by weight and more preferably from about 0.05 to about 0.3 percent by weight based on the polymers. The types of materials suitable for use as particles herein include, among others, silica, kaolin, china clay, aluminosilicates, diatomaceous earth, carbon black, and the like. If clear and transparent films are desired, the colorless particles are selected to obtain the desired effect.

The preferred polymers of the invention are the polyalkylene terephthalate polymers produced from the reaction product of terephthalic acid, or a dialkyl ester of terephthalic acid (especially dimethyl terephthalate) and glycols of the series $HO(CH_2)_nOH$ wherein $n$ is an integer greater than 1 but not exceeding 10. Suitable glycols include ethylene glycol, trimethylene glycol, hexamethylene glycol, decamethylene glycol and the like. Other suitable functional compounds which can be reacted with terephthalic acid or with a dialkyl ester of terephthalic acid to produce linear polyester types, can include p-xylylene glycol, hydroquinone, cyclic glycols and the like. Other polymers which can be utilized include, among others, polyalkylene terephthalate-containing modifiers such as dibasic acids including among others, isophthalic acid, sebacic acid, adipic acid, sulfonated derivatives and the like.

The polymers of this invention are produced by incorporating the completely dispersed insoluble and chemically inert particles, described above, into the initial reacting materials of the monomer, e.g., bis (hydroxyalkylene) terephthalate, or incorporated into the monomer. It is essential, however, that the dispersion of the particles be maintained throughout the polymer. A suitable way of completely dispersing the particles is by adding the glycol to the particles and exposing the mixture to ultrasonic vibrations.

In the production of the preferred polymers of this invention i.e. polyalkylene terephthalate, monomeric bis (hydroxyalkyl)terephthalate is produced as the intermediate. The monomeric bis(hydroxyalkyl) terephthalate can be prepared by at least two different methods. In one method, the dialkyl ester of terephthalic acid in which the alkyl radicals can contain from 1 to 7 carbon atoms can generally be reacted with about two molecular proportions of the glycols described above. It is preferred to use higher proportions of the glycol, i.e. in excess of two molecular proportions of the glycol per molecular proportion of the terephthalate derivative, since by using such proportions, the initial transesterification is caused to take place more rapidly and completely.

The reaction for the transesterification is conducted under conditions of elevated temperatures and atmospheric, subatmospheric or superatmospheric pressure. Normally, the desired temperatures of the reaction can range from about the boiling temperature of the reaction mixture to as high as 250° C., if desired. During the course of this transesterification reaction, utilizing a dialkyl ester of terephthalic acid as the starting material, the glycol reacts with the starting material to form bis(hydroxyalkyl) terephthalate and an alkanol by-product. As an illustration, the reaction of dimethyl terephthalate with ethylene glycol will produce bis(2-hydroxyethyl) terephthalate and methanol. It is highly desirable to remove the methanol content as it is formed in the reaction to assure a faster reaction and then further remove the unused ethylene glycol which is distilled from the transesterification product.

Although the bis(hydroxyalkyl) terephthalate monomer can be produced without the use of a catalyst, it is highly desirable to utilize a catalyst to speed up the reaction. Many catalysts are known for use in the initial transesterification reaction including, among others: the alkali metals, alkaline earth metals, beryllium, boron cadmium, cerium, chromium, cobalt, lanthanum, magnesium, manganese, titanium, zinc and the like and the corresponding compounds of the above-described metals such as oxides, glycol oxides, carbonates, acyl derivatives and the like and combinations of the above-described catalysts. It is highly desirable to utilize a catalyst which will not only speed up the reaction but will not adversely affect the physical properties of the resulting product.

Another method for producing bis(hydroxylalkyl) terephthalate is the direct esterification of terephthalic acid and the glycols described above under similar conditions as described in U.S. Patent 3,050,533. In this direct esterification, however, the by-product of the reaction is water which is distilled from the reaction product.

The bis(hydroxyalkyl) terephthalates produced by the process of this invention are converted into high molecular weight polymerized products by heating at a temperature above the boiling point of the corresponding glycol or reaction mixture under conditions effecting removal of the glycol or water and to temperatures as high as 325° C., if desired. It is essential in obtaining the desired polymerized product that during the heating or during part of the heating, the pressure is reduced so as to provide rapid distillation of the excess of glycol or water. The pressure may be reduced in successive stages so that the heating begins at normal pressure, is continued at a reduced pressure and is completed at a further reduced pressure. Pressures in the range from about 1 to 10 millimeters of mercury are preferred. The materials used as catalysts in the esterification reaction may also be present as a catalyst in the polymerization reaction. The preferred polymerization catalysts are the antimony compounds such as antimony trioxide, antimonic acid and the like to accelerate conversion of the ester product into high molecular weight polymers having intrinsic viscosities as measured in ortho-chlorophenol in excess of 0.2, preferably ranging from about 0.5 to about 1.0 for further processing into the useful films of this invention.

The heating of the polymerization reaction is conducted under conditions to prevent oxidation, i.e., any presence of oxygen should be avoided, and a slow stream of an inert gas, for example nitrogen, carbon dioxide and the like can be passed through or over the molten mass. During the heating and polymerization, viscosity of the melt gradually increases; the temperature must be maintained high enough to keep the mass in the molten state during the entire heating period. The heating is continued at least until a film formed from the melt possesses the desired properties and the melting point of the polymerized product exceeds about 240° C., preferably exceeding 250° C. After the heating is completed the product may be utilized to produce films or otherwise removed from the reaction vessel in molten form and formed into blocks, chips, and the like for further use.

The preferred polymers of this invention are the polyethylene terephthalate polymers containing silica particles having a diameter in the range from about 10 to 30 millimicrons and present in amounts ranging from 0.05 to 0.3 percent by weight based on the polymer. The extrusion of this polymer provides a highly desirable clear and transparent film.

After the high molecular weight synthetic linear polymer of this invention has been produced, the polymer is extruded on polished revolting casting drums and bioxially stretched, i.e., forward and lateral stretching in either order or simultaneously to impart strength and toughness to the film. The amount of stretching can range from about 1.3 to about 4.5 times the original dimensions and preferably from about 2.5 to 4.0 times the original dimensions. The stretching operation is carried out at temperatures in the range from about the second order transition temperature and below the temperature at which the polymer softens and melts. The method of forming the film can be carried out by the use of conventional tensilizing equipment and consistently produces a uniform product.

The unique feature of the film of this invention are the protrusions from the surface of the film. As has been described, the surface protrusions are made up of insoluble and chemically inert particles which are free of optically polarizing properties and are incorporated in the film by substantially complete dispersion of the particles. The particles are an integral part of the film and on the surface no greater than about one half of the particle coated by polymer is protruded from the non-protruded film base. In general, however, less than one half of the particle coated with film is exposed at the surface. The protrusions on the surface of the film range from about 2 to 100 millimicrons from the non-protruded film surface, preferably ranging from 5 to 50 millimicrons and more preferably ranging from 5 to 20 millimicrons while the coefficient of friction measuring both limiting and dynamic friction ranges from 0.3 to 1.0, preferably from about 0.4 to 0.8. Comparing the coefficient of friction of a non-protruded film which is exceptionally high at approximately 4 with that of the film of this invention having small protrusions ranging from 0.3 to 1.0, it should be noted that the film of this invention has excellent slip characteristics and closely approaches the desirable surface perfection because of its minute protrusions.

The following examples will serve to illustrate the invention without limiting the same:

Example I

In a reaction vessel, 3500 pounds of dimethyl terephthalate and 2600 pounds of ethylene glycol are placed. This mixture is heated to 150° C. To the mixture is added 3.5 pounds silica having a diameter in the range from 10 to 30 millimicrons completely dispersed in 40 pounds ethylene glycol using ultarsonic vibrations. Additionally, 1.7 pounds of maganese glycol oxide in 6 pounds of ethylene glycol is added to the reaction mixture. The reaction mixture is heated to 200° C. at atmospheric pressure while removing methanol from the mixture for a period of time sufficient to remove the theoretical amount of methanol produced. The temperature is gradually increased while removing the excess ethylene glycol until the temperature reaches 225° C. to form monomeric bis(2-hydroxyethyl) terephthalate. To the monomeric bis(2-hydroxyethyl) terephthalate is added 1.1 pounds trimethyl phosphite dissolved in 2 pounds ethylene glycol and 1:5 pounds antimony trioxide dispersed in 6 pounds of ethylene glycol. The pressure of the reaction kettle is reduced gradually from atmospheric to about 1 millimeter of pressure mercury while raising the temperature of the reaction mixture to 285° C. During this period ethylene glycol is removed during the polymerization and the temperature is maintained until the intrinsic viscosity of the polymer reaches about 0.6 to 0.8 as measured in ortho-chlorophenol. The polymer is then cast into ribbon, cut into irregular chips, and dried for a sufficient period of time to reduce the moisture content below about 0.02%. The dried polymer is melted and extruded in a thickness of 0.015 inch on a polished revolving drum. The film is then subjected successively to a forward stretching of 3.2 times its original length and then to a lateral stretching 2.8 times its original length. The resulting film 0.0015 inch in thickness is heat set at 225° C. for approximately 30 seconds, cooled below 100° C. and wound on a mandrel. The coefficient of friction of the finished film ranges from about 0.5 to about 0.7 while the protrusions on the surface of the film did not exceed 10 millimicrons and exceeded about 2 millimicrons from the non-protruded film surface. The film is transparent and when used in the production of magnetic tape i.e. coating the film with a suitable coating material containing magnetic ferric oxide, provided a highly desirable product because of the minute protrusions.

Example II

In a reaction vessel, 3500 pounds of dimethyl terephthalate and 2600 pounds of ethylene glycol are placed. This mixture is heated to 150° C. To the mixture is added 3.5 pounds silica having a diameter of 5 microns completely dispersed in 40 pounds ethylene glycol using ultrasonic vibrations. Additionally, 1.7 pounds of manganese glycol oxide in 6 pounds of ethylene glycol is added to the reaction mixture. The reaction mixture is heated to 200° C. at atmospheric pressure while removing methanol from the mixture for a period of time sufficient to remove the theoretical amount of methanol produced. The temperature is gradually increased while removing the excess ethylene glycol until the temperature reaches 225° C. to form monomeric bis(2-hydroxyethyl) terephthalate. To the monomeric bis(2 - hydroxyethyl) terephthalate is added 1.1 pounds trimethyl phosphite dispersed in 2 pounds ethylene glycol and 1.5 pounds antimony trioxide dispersed in 6 pounds of ethylene glycol. The pressure of the reaction kettle is reduced gradually to about 10 to 20 millimeters of pressure mercury while raising the temperature of the reaction mixture to 285° C. During the period, ethylene glycol is removed during the polymerization and the temperature is maintained until the intrinsic viscosity of the polymer reaches about 0.6 to 0.8 as measured in ortho-chlorophenol. The polymer was then cast into ribbon, cut into irregular chips, and dried for a sufficient period of time to reduce the moisture content below about 0.02 percent. The dried polymer is melted and extruded in a thickness of 0.015 inch on a polished revolving drum. The film is then subjected successively to a forward stretching of 3.2 times its original length and then to a lateral stretching 2.8 times its original length. The resulting film 0.0015 inch in thickness is heat set at 225° C. for approximately 30 seconds, cooled below 100° C. and wound on a mandrel. The coefficient of friction of the finished film is about 1.0 to about 1.5 while the protrusions on the surface of the film approximated 2.5 microns.

In a similar manner as above substituting polypropylene as the polymer, similar results are obtained as in the film production of Examples I and II. Additionally terephthalic acid can be substituted for dimethyl terephthalate in Examples I and II to obtain the similar results.

It is to be understood that the foregoing description is merely illustrative and preferred embodiments of the invention of which many variations may be made by those skilled in the art within the scope of the following claims without departing from the spirit thereof.

What is claimed is:

1. A thermoplastic film of a high molecular weight synthetic linear biaxially oriented polymer having a coefficient of friction in the range from 0.3 to 1.0 and containing surface protrusions as an integral part of said film, said protrusions ranging in size from 2 to 100 millimicrons from the non-protruded base of said film and containing from 0.01% to 0.5% by weight of insoluble and chemically inert particles free from optically polarizing properties selected from the group consisting of silica, kaolin, china clay, aluminosilicates, diatomaceous earth and carbon black, said particles being substantially completely dispersed throughout said film.

2. The product of claim 1 wherein the thermoplastic film is polyethylene terephthalate.

3. The product of claim 2 wherein the insoluble and chemically inert particles are silica ranging in amounts from 0.01 to 0.5 percent by weight, the protrusions of said film range from about 5 to 10 millimicrons and the coefficient of friction of said film ranges from 0.5 to 1.0.

4. The product of claim 3 wherein the silica as dispersed in said film ranges in amounts from 0.05 to 0.3 percent by weight of the film.

5. The method of forming a thermoplastic film having a coefficient of friction in the range from 0.3 to 1.0 and containing surface protrusions as an integral part of said film, said protrusions ranging in size from 2 to 100 millimicrons from the non-protruded base of said film which comprises forming a composition of a high molecular weight synthetic linear orientable polymer having substantially completely dispersed therein insoluble and chemically inert particles free of optically polarizing properties selected from the group consisting of silica, kaolin, china clay, aluminosilicates, diatomaceous earth and carbon black, said particles having a diameter in the range from 5 to 200 millimicrons and said particles being present in amounts ranging from 0.01 to 0.5 percent by weight based on the polymer, extruding a film from said polymer, biaxially stretching said film at a temperature in the range from about the second order transition temperature of said polymer to below the temperature at which the polymer softens and melts.

6. The method of claim 5 wherein the film is biaxially stretched 1.3 to 4.5 times its original dimensions.

7. The method of claim 5 wherein the film is biaxially stretched 2.5 to 4.0 times its original dimensions.

8. The method of claim 5 wherein the polymer is polyethylene terephthalate.

9. The method of claim 8 wherein the insoluble and chemically inert particles have a diameter in the range from 10 to 20 millimicrons.

10. The method of claim 8 wherein the biaxial stretching ranges from 1.3 to 4.5 times its original dimensions.

11. A polyethylene terephthalate film of a high molecular weight and biaxially oriented having a coefficient of friction in the range from 0.3 to 1.0 and containing surface protrusions as an integral part of said film, said protrusions ranging in size from about 2 to 10 millimicrons from the non-protruded base of said film which comprises forming a composition of a high molecular weight polyethylene terephthalate orientable polymer having substantially completely dispersed therein silica, said silica having a diameter in the range from 10 to 20 millimicrons and present in amounts ranging from 0.05 to 0.3 percent by weight extruding a film from said polymer, and biaxially stretching from 2.5 to 4.0 times its original dimensions at a temperature in the range from about the second order transition temperature of said polymer to below the temperature at which the polymer softens and melts.

12. The process for producing a high molecular weight orientable synthetic linear polymer wherein the polymer is produced in the presence of a substantially completely dispersed chemically inert and insoluble particles free of optically polarizing properties selected from the group consisting of silica, koalin, china clay, aluminosilicates, diatomaceous earth and carbon black, said particles having a diameter in the range from 5 to 200 millimicrons and present in amounts ranging from 0.01 to 0.5 percent by weight.

13. The process for producing a high molecular weight orientable polyethylene terephthalate polymer by reacting a member selected from the group of terephthalic acid and dimethyl terephthalate with a glycol in the presence of a substantially complete dispersion of chemically inert and insoluble particles free of optically polarizing properties selected from the group consisting of silica, kaolin, china clay, aluminosilicates, diatomaecous earth and carbon black, said particles having a diameter in the range from 5 to 200 millimicrons and present in amounts ranging from 0.01 to 0.5 percent by weight, for a sufficient period of time under sufficient heat to remove the water or corresponding alcohol produced therein and polymerizing the resulting product for a period of time in the presence of a polymerization catalyst until a high molecular weight polyethylene terephthalate polymer is produced.

14. A process for producing a high molecular weight orientable polyethylene terephthalate polymer by reacting a terephthalic acid with a glycol having the formula HO(CH$_2$)$_n$OH, wherein $n$ is an integer greater than 1 and not exceeding 10 in the presence of a substantially complete dispersion of chemically inert and insoluble particles free of optically polarizing properties selected from the group consisting of silica, koalin, china clay, aluminosilicates, diatomaceous earth and carbon black, said particles having a diameter in the range from 10 to 20 millimicrons and present in amounts from 0.05 to 0.3 percent by weight, for a sufficient period of time under sufficient heat to produce bis(hydroxyalkyl) terephthalate while removing the excess water and polymerizing the resulting product for a period of time in the presence of an antimony catalyst until a high molecular weight polymer is produced.

15. The process of claim 14 wherein the particles are silica.

16. The process of claim 14 wherein the dispersion of inert particles are subjected to ultrasonic vibrations.

17. The process of claim 14, wherein the glycol is ethylene glycol.

18. The process of claim 14 wherein dimethyl terephthalate is substituted for terephthalic acid.

19. The process of claim 18 wherein the glycol used is ethylene glycol.

20. A high molecular weight synthetic linear polymer having an intrinsic viscosity in the range from 0.2 to 1.0 and containing insoluble and chemically inert particles free of optically polarizing properties selected from the group consisting of silica, kaolin, china clay, aluminosilicates, diatomaceous earth and carbon black, said particles having a diameter in the range from 5 to 200 millimicrons and in amounts ranging from 0.01 to 0.5 percent by weight, said particles being substantially completely dispersed throughout said polymer.

21. The polymer of claim 20, wherein the composition is polyethylene terephthalate.

22. The polymer of claim 21. wherein the amounts of dispersed particles in said polymer ranges from 0.05 to 0.3 percent by weight of said polymer and having a diameter in the range from about 10 to 20 millimicrons.

References Cited

UNITED STATES PATENTS

| 3,154,461 | 10/1964 | Johnson | 260—37 |
| 2,974,105 | 3/1961 | Iler | 260—40 |
| 3,201,506 | 8/1965 | Bills | 264—210 |

FOREIGN PATENTS

| 518,528 | 11/1955 | Canada. |
| 504,714 | 4/1939 | Great Britain. |

MORRIS LIEBMAN, *Primary Examiner.*

L. T. JACOBS, *Assistant Examiner.*

U.S. Cl. X.R.

161—164, 402; 260—40